(12) United States Patent
Woditschka

(10) Patent No.: US 6,761,528 B2
(45) Date of Patent: Jul. 13, 2004

(54) STEAM TURBINE AND METHOD OF MEASURING THE VIBRATION OF A MOVING BLADE IN A FLOW PASSAGE OF A STEAM TURBINE

(75) Inventor: Frank Woditschka, Duisburg (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/169,147

(22) PCT Filed: Sep. 13, 2001

(86) PCT No.: PCT/EP01/10599

§ 371 (c)(1),
(2), (4) Date: Oct. 8, 2002

(87) PCT Pub. No.: WO02/23141

PCT Pub. Date: Mar. 21, 2002

(65) Prior Publication Data

US 2003/0118442 A1 Jun. 26, 2003

(30) Foreign Application Priority Data

Sep. 14, 2000 (EP) .............................................. 00120036

(51) Int. Cl.[7] .............................................. F01D 25/00
(52) U.S. Cl. ........................ 415/1; 415/118; 415/200; 73/653; 73/655
(58) Field of Search ................................. 415/118, 200, 415/1; 416/61; 73/596, 655, 653

(56) References Cited

U.S. PATENT DOCUMENTS

| | | |
|---|---|---|
| 3,695,778 A | 10/1972 | Taylor |
| 4,080,823 A | 3/1978 | Stargardter |
| 4,326,804 A * | 4/1982 | Mossey ........................ 356/623 |
| 4,518,917 A | 5/1985 | Oates et al. |
| 4,595,340 A | 6/1986 | Klassen et al. |
| 4,934,192 A | 6/1990 | Jenkins |
| 4,996,880 A | 3/1991 | Leon et al. |
| 5,201,227 A * | 4/1993 | Iinuma et al. ................. 73/655 |
| 5,407,326 A | 4/1995 | Lardellier |
| 5,410,405 A * | 4/1995 | Schultz et al. ............... 356/493 |
| 5,570,186 A | 10/1996 | Satzger et al. |
| 5,761,956 A * | 6/1998 | Beeson et al. ................. 73/660 |
| 5,785,775 A * | 7/1998 | Smashey et al. ............. 148/669 |

FOREIGN PATENT DOCUMENTS

| | | |
|---|---|---|
| EP | 0 558 843 | 9/1993 |
| EP | 0 924 381 | 6/1999 |

OTHER PUBLICATIONS

A Review of Analysis Techniques for Blade Tip–Timing Measurements, S. Heath, pp. 1–8; Dec. 01, 1997 (from Jun. 2–Jun. 5, 1997 conference).

* cited by examiner

*Primary Examiner*—Ninh H. Nguyen
(74) *Attorney, Agent, or Firm*—Harness, Dickey & Pierce, P.L.C.

(57) ABSTRACT

The invention relates to a steam turbine (3) comprising an optical measuring system (60) for measuring a moving blade vibration. A transmitter (55) produces a light beam (61) which strikes the moving blades (27, 29, 31, 33) and is reflected by these into a receiver (57). By providing that the transmitter (55) is separated from the receiver (56), the invention achieves a measuring angle that actually reduces the scattered light effect of the steam enough to enable reliable optical measurements of the blades vibration. The invention also relates to a method for measuring the vibration of a moving blade (33) in a flow channel (19, 21, 23, 25) of a steam turbine (3).

19 Claims, 2 Drawing Sheets

STEAM TURBINE AND METHOD OF MEASURING THE VIBRATION OF A MOVING BLADE IN A FLOW PASSAGE OF A STEAM TURBINE

This application is the national phase under 35 U.S.C. § 371 of PCT International Application No. PCT/EP01/10599 which has an International filing date of Sep. 13, 2001, which designated the United States of America and which claimed priority on European application No. EP 00120036.9 filed Sep. 14, 2000, the entire contents of which are hereby incorporated by reference.

FIELD OF THE INVENTION

The invention generally relates to a steam turbine having a flow passage in which a moving blade is arranged. More preferably, it relates to one including a measuring system for measuring a vibration of the moving blade. The invention also generally relates to a method of measuring the vibration of a moving blade in a flow passage of a steam turbine.

BACKGROUND OF THE INVENTION

The technical field of the invention is the measurement of blade vibrations in fluid-flow machines. Moving blades in fluid-flow machines are subjected to high loads. A vibration may be induced in them on account of alternating stresses, this vibration, if it lies in the vicinity of a natural vibration in the respective blade, leading to especially high mechanical stresses of this blade. In order to detect such especially high loads in good time, the vibration states of the blades are measured in different ways.

U.S. Pat. No. 4,996,880 discloses a steam turbine and a method of measuring the vibration of a moving blade in the flow passage of a steam turbine. Here, the vibration of the moving blade is measured by an acoustic signal. A Doppler displacement which is caused by the movement of the moving blade is measured with an acoustic sensor. Depending on the vibration state of the moving blade, a characteristic Doppler signal is obtained, so that, in inverse relationship to the Doppler signal, the vibration state of the moving blade can be deduced.

U.S. Pat. No. 4,518,917 shows a method of measuring the vibration state of moving blades, in which method the distance of the blades from the surrounding casing is measured. An impedance dependence of sensors arranged in the casing is utilized in this case. Depending on the distance of a moving blade from the sensor, an impedance change is obtained.

A further method of measuring the vibration of a moving blade has been disclosed by U.S. Pat. No. 4,934,192. Here, an axial deflection on account of an axial vibration of the moving blade is measured by two sensors being arranged symmetrically over a prominence on the tip of the moving blade in the rest state of the latter. The sensors are each designed as an electrical winding in which a voltage is induced depending on the distance from the prominence on the tip of the moving blade. In the event of an asymmetrical arrangement of the sensors relative to the tip of the moving blade, this asymmetrical arrangement occurring on account of an axial vibration of the moving blade, a differential signal is produced which characterizes the blade vibration.

In the paper "A Review of Analysis Techniques for Blade Tip Timing Measurements", S. Heath, M. Imregum, ASME publication 97/GT/218, presented at the International Gas Turbine and Aeroengine Congress and Exhibition, Orlando, Fla., USA, May 2, 1997, a method of measuring the blade vibration by means of a laser is described. However, this method relates solely to gas turbines.

The methods for the non-contact measurement of the vibration of a moving blade are either comparatively inaccurate or require a magnetizable material for the moving blade or the awkward and unreliable placement of a magnetic marking on the moving blade.

SUMMARY OF THE INVENTION

Accordingly, an object of an embodiment of the invention is to specify a steam turbine in which the measurement of the vibration of a moving blade is possible in a non-contact and reliable manner largely independent of properties of the moving blade. A further object of an embodiment of the invention is to specify a corresponding method of measuring the vibration of a moving blade.

According to an embodiment of the invention, an object which relates to a steam turbine may be achieved by a steam turbine having a flow passage in which a moving blade is arranged, and having a measuring system for measuring a vibration of a moving blade. The measuring system may include a transmitter for emitting a light beam to the moving blade and a receiver for receiving the light beam reflected from the moving blade, and the transmitter being separate from the receiver.

The use of an optical measuring system for measuring the vibration state of a moving blade in a flow passage of a steam turbine has hitherto not even been taken into consideration. This is due to the fact that, according to the prevailing opinion, the steam flowing in the flow passage makes optical detection of the moving blade virtually impossible on account of high scatter in the steam. In this case, however, measuring systems have hitherto always been based on a transmitter and receiver combined in a unit, so that in principle measurements are taken in backscatter. Such systems are used, for example, for measuring blade vibrations of gas turbines. They offer the advantage that only the casing part defining the flow passage need be interfered with for fitting the transmitter and receiver.

According to the findings of an embodiment of the invention, such an optical measuring system may now also be used in a steam turbine for measuring a blade vibration if the rigid concept of the coupled transmitter/receiver unit is dispensed with. This is because, in a suitable arrangement of transmitter and receiver, the proportion of scattered radiation which is caused by the steam can now be kept so low that a reliable measurement of blade vibration is made possible.

The transmitter and receiver need not be designed as a completely light-producing or light-converting unit; they may also be designed, for example, as a glass fiber cable and direct a light beam from a light source or to a converting unit, such as a photocell for instance.

The transmitter is preferably designed for emitting a laser beam. On account of its monochromasy and low divergence, a laser beam is especially suitable for the measurement.

The transmitter and receiver are preferably arranged in such a way that the transmitted light beam and the reflected light beam enclose an angle of reflection of at least 45° with one another. The angle of reflection is also preferably greater than 90°. In such a large-angled arrangement, a good ratio of light beam reflected directly into the receiver to scattered radiation caused in the steam is obtained, since the proportion of scattered radiation drops with a larger angle.

The transmitter is preferably set in such a way that the transmitted light beam illuminates an area of less than 1 mm² on the moving blade. High focusing or a low divergence of the light beam likewise encourages a low proportion of scattered radiation.

The receiver, in a casing defining the flow passage, is preferably arranged so as to be set back from the flow passage in such a way that, apart from the directly reflected light beam, at most a small proportion of scattered radiation reaches the receiver. By the receiver being set back in the casing, a diaphragm, as it were, is constructed, and this diaphragm essentially allows only such light to reach the receiver which spreads in a virtually rectilinear direction from the illuminated area on the moving blade to the receiver. As a result, scattered radiation spreading at other angles is mostly screened off before entering the receiver.

The moving blade is preferably made of a non-magnetic material. The moving blade is also preferably made of a titanium-based alloy. Here, the expression "non-magnetic" means that the material of the moving blade has no appreciable ferromagnetic properties. Especially in the case of such a material, a simple non-contact measurement by means of magnetic induction is ruled out. Such a material is, for example, a titanium-based alloy, which are used in new generations of steam turbines, in particular when the moving blades of the last stages of low-pressure parts are very large. However, such large blades especially are susceptible to vibration excitation and are loaded to a considerable extent by vibrations. Here, especially, a reliable monitoring system for measuring the blade vibration states must therefore be used. By means of the optical monitoring of the blade vibrations, this is also possible for such blades in a simple and reliable manner.

According to an embodiment of the invention, an object which relates to a method may be achieved by a method of measuring the vibration of a moving blade in a flow passage of a steam turbine, a light beam being directed onto the moving blade and being reflected from the latter at an angle of reflection greater than 45° and directed to a receiver, and the blade vibration being calculated from the signal thus received.

The advantages of such a method follow in accordance with the above statements in relation to the advantages of the steam turbine.

The angle of reflection is preferably greater than 90°. The light beam used is preferably a laser beam.

The light beam is preferably directed onto a reflecting surface, lying on the moving blade, in such a way that the illuminated part of the reflecting surface is less than 50 mm².

The moving blade is preferably made of a non-magnetic material, also preferably of a titanium-based alloy.

BRIEF DESCRIPTION OF THE DRAWINGS

The invention is explained in more detail by way of example with reference to the drawings. In the drawings, partly schematically and not to scale.

The same reference numerals have the same meaning in the different figures.

DETAILED DESCRIPTION OF THE PREFERRED EMBODIMENTS

Figure 1:
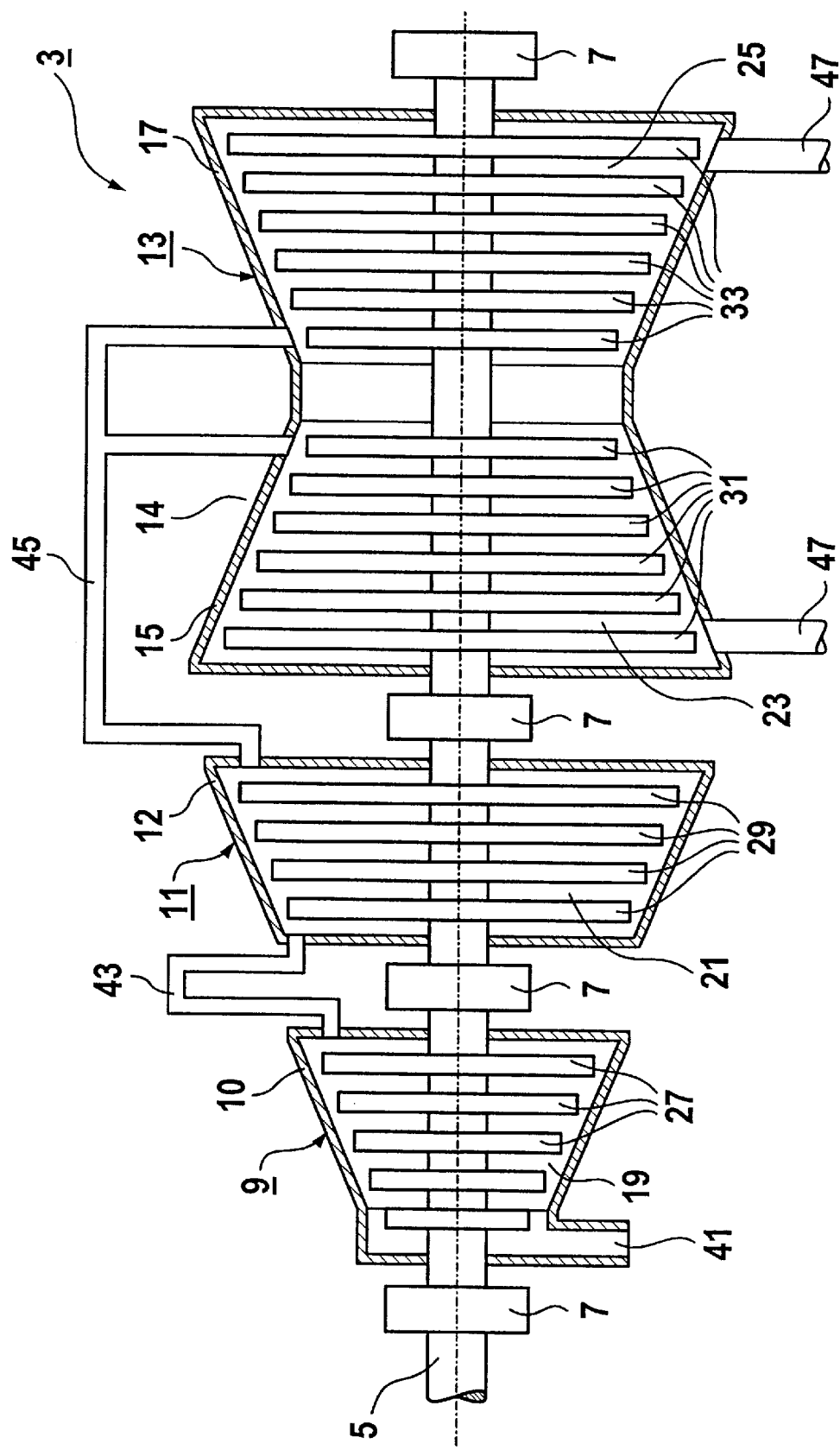
FIG. 1 shows a steam turbine.

FIG. 1 shows a steam turbine 3. A high-pressure part 9, an intermediate-pressure part 11 and a double-flow low-pressure part 13 are arranged one behind the other on a common shaft 5 between bearings 7. The double-flow low-pressure part 13 consists of a first low-pressure half 15 and a second low-pressure half 17. The low-pressure part 13 has a low-pressure casing 14. The intermediate-pressure part 11 has an intermediate-pressure casing 12. The high-pressure part 9 has a high-pressure casing 10. The high-pressure part 9 has a high-pressure flow passage 19. The intermediate-pressure part 11 has an intermediate-pressure flow passage 21. The low-pressure part 13 has a first low-pressure flow passage 23 in the first low-pressure half 15 and a second low-pressure flow passage 25 in the second low-pressure half 17. Moving blades 27 are arranged in successive moving-blade rings in the high-pressure flow passage 19. Intermediate-pressure moving blades 29 are arranged in successive moving-blade rings in the intermediate-pressure flow passage 21. Moving blades 31 are arranged in successive moving-blade rings in the low-pressure flow passage 23 of the first low-pressure half 15. Moving blades 33 are arranged in successive moving-blade rings in the low-pressure flow passage 25 of the second low-pressure half 17 of the low-pressure part 13.

During operation of the steam turbine 3, live steam is fed to the high-pressure part 9 via a high-pressure steam feed line 41, this live steam partly expanding in the high-pressure part 9 and converting energy into energy of rotation of the shaft 5 in the process. The partly expanded steam is then directed via an intermediate-pressure feed line 43 to the intermediate-pressure part 11, where it expands further and transmits further energy of rotation to the shaft 5. The steam is then directed in double flow via a low-pressure steam feed line 45 to the low-pressure part 13 in such a way that it flows in parallel through the first low-pressure half 15 on the one hand and through the second low-pressure half 17 on the other hand. In the process, the steam expands further and further energy of rotation is transmitted to the shaft 5. The largely expanded steam is then fed via discharge lines 47 to a condenser (not shown). Also not shown for the sake of clarity are guide blades, which are arranged alternately to the moving blades in the axial direction in the flow passages.

The steam flowing past the moving blades may lead to vibrations being induced in the moving blades. This applies in particular to the very large moving blades 31, 33 of the low-pressure part 13, to be precise in particular to the last stages of the low-pressure part 13. Such vibrations may result in the moving blades 31, 33 being loaded in such a way that the service life is reduced. In order to detect this in good time, the vibration state of each moving blade 31, 33 is monitored. With previous measuring techniques, this was only possible in a complicated manner, or virtually not all in the case of non-magnetic moving blades 31, 33.

Figure 2:
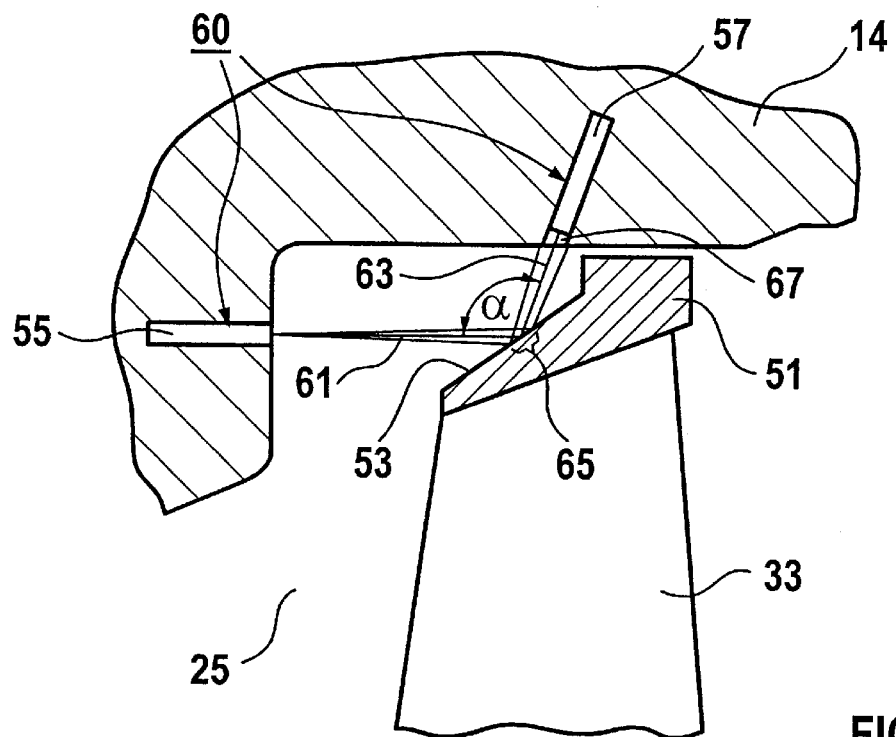
FIG. 2 shows a measuring system for measuring the vibration of a moving blade in a steam turbine.
Figure 3:
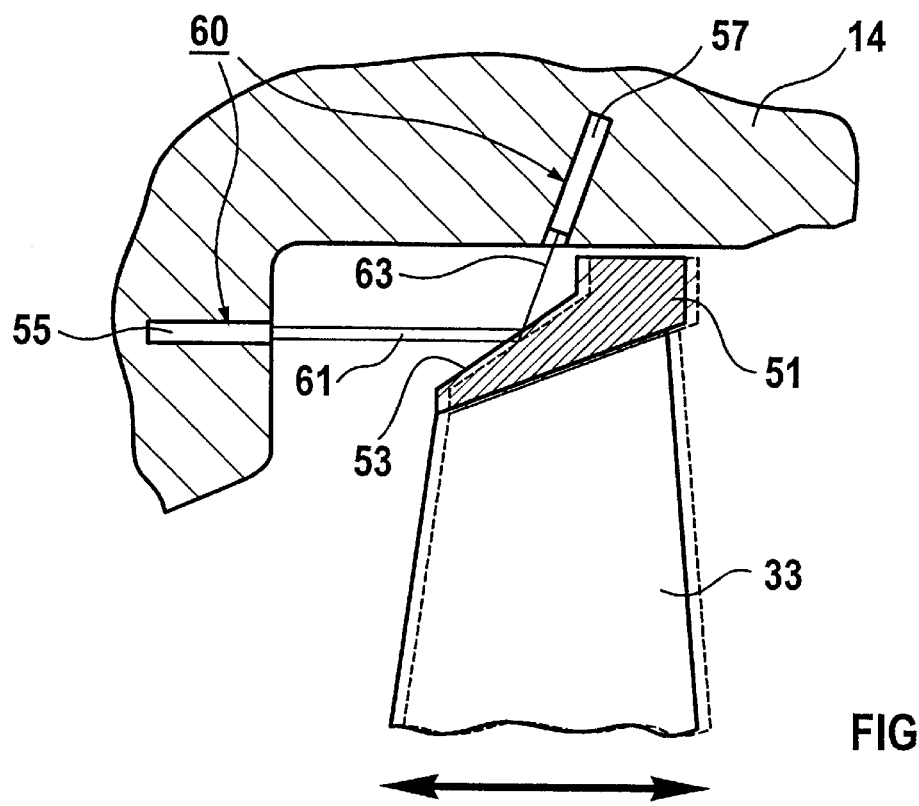

FIG. 2 shows a detail of the second low-pressure half 17 of FIG. 1. A measuring system 60 is arranged in the low-pressure casing 14. The measuring system 60 includes a transmitter 55 and a receiver 57. A light beam 61, formed by a laser beam, is directed by the transmitter 55 into the flow passage 25 and onto a moving blade 33. The moving blade 33 has a shroud band 51 which has a bevelled reflecting surface 53 toward the transmitter 55. From the reflecting surface 53, the light beam 61 is directed as reflected light beam 63 to the receiver 57. The transmitter 55 and the receiver 57 are separated from one another in such a way that an angle x greater than 90° is obtained between the incident light beam 61 and the reflected light beam 63. On the reflecting surface 53, the light beam 61 illuminates a part area 65 which is less than 1 mm².

Due to the separate arrangement of transmitter 55 and receiver 57, it is possible to take a reflection measurement even in the flow passage 25, through which steam flows, of the steam turbine 3. Whereas according to the prevailing opinion the steam should result in far too much scattered light being produced, as a result of which an optical measurement would not be realizable, the arrangement shown, on account of the comparatively large angle x, offers the possibility of a reliable optical measurement without interference by scattered light. This is further assisted by a low divergence of the light beam 61 and by the receiver 57 being set back in the low-pressure casing 14, as a result of which a channel-like diaphragm is produced which largely screens off scattered light.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A steam turbine, comprising:
    a flow passage in which a moving blade is arranged; and
    a measuring system for measuring a vibration of the moving blade, the measuring system including, a transmitter for emitting a light beam toward the moving blade, and
    a receiver for receiving the light beam reflected from the moving blade, the transmitter being separate from the receiver, wherein the transmitter and receiver are arranged in at least one casing part of the steam turbine and wherein the receiver, in a casing defining the flow passage, is arranged so as to be set back from the flow passage in such a way that, apart from the directly reflected light beam, at most a small proportion of scattered radiation reaches the receiver.

2. The steam turbine as claimed in claim 1, wherein the transmitter is designed for emitting a laser beam.

3. The steam turbine as claimed in claim 1, wherein the transmitter and receiver are arranged such that the transmitted light beam and the reflected light beam enclose an angle of reflection of at least 45° with one another.

4. The steam turbine as claimed in claim 3, wherein the angle of reflection is at least 90°.

5. The steam turbine as claimed in claim 1, wherein the transmitter is set such that the transmitted light beam illuminates an area of less than 1 mm$^2$ on the moving blade.

6. The steam turbine as claimed in claim 1, wherein the moving blade is made of a non-magnetic material.

7. The steam turbine as claimed in claim 6, wherein the moving blade is made of a titanium-based alloy.

8. A method of measuring a vibration of a moving blade in a flow passage of a steam turbine, comprising:
    directing a light beam onto a moving blade, the light beam being reflected from the moving blade at an angle of reflection greater than 45°;
    directing the reflected light beam to a receiver; and
    calculating the blade vibration from the received reflected light beam,
    wherein the light beam is directed onto a reflecting surface on the moving blade, in such a way that the illuminated part of the reflecting surface is less than 50 mm$^2$.

9. The method as claimed in claim 8, wherein the angle of reflection is greater than 90°.

10. The method as claimed in claim 8, wherein the light beam is a laser light beam.

11. The method as claimed in claim 8, wherein the moving blade is made of a non-magnetic material.

12. The method as claimed in claim 8, wherein the moving blade is made of a titanium-based alloy.

13. A measuring system for measuring a vibration of a moving blade, arranged in a flow passage of a steam turbine, comprising:
    a transmitter for emitting a light beam toward the moving blade, and
    a receiver for receiving the light beam reflected from the moving blade, the transmitter being separate from the receiver, wherein the transmitter and receiver are arranged in at least one casing part of the steam turbine and wherein the receiver, in a casing defining the flow passage, is arranged so as to be set back from the flow passage in such a way that, apart from the directly reflected light beam, at most a small proportion of scattered radiation reaches the receiver.

14. The measuring system as claimed in claim 13, wherein the transmitter is designed for emitting a laser beam.

15. The measuring system as claimed in claim 13, wherein the transmitter and receiver are arranged such that the transmitted light beam and the reflected light beam enclose an angle of reflection of at least 45° with one another.

16. The measuring system as claimed in claim 15, wherein the angle of reflection is at least 90°.

17. The measuring system as claimed in claim 13, wherein the transmitter is set such that the transmitted light beam illuminates an area of less than 1 mm$^2$ on the moving blade.

18. The measuring system as claimed in claim 13, wherein the moving blade is made of a non-magnetic material.

19. The measuring system as claimed in claim 13, wherein the moving blade is made of a titanium-based alloy.

* * * * *